L. C. WARNER.

CORSET.

No. 7,782. Reissued July 3, 1877.

Attest:
Howard H. Brady
Fred Benjamin

Inventor:
L. C. Warner
By his attorney
Charles E. Foster

N. PETERS, PHOTO-LITHOGRAPHER, WASHINGTON, D. C.

UNITED STATES PATENT OFFICE.

LUCIEN C. WARNER, OF NEW YORK, N. Y.

IMPROVEMENT IN CORSETS.

Specification forming part of Letters Patent No. 172,214, dated January 11, 1876; Reissue No. 7,782, dated July 3, 1877; application filed March 6, 1877.

*To all whom it may concern:*

Be it known that I, LUCIEN C. WARNER, of the city, county, and State of New York, have invented an Improved Corset, of which the following is a specification:

The object of my invention is a corset constructed as fully described hereinafter, to facilitate its manufacture and to conform nicely to the body of the wearer.

Figure 1:
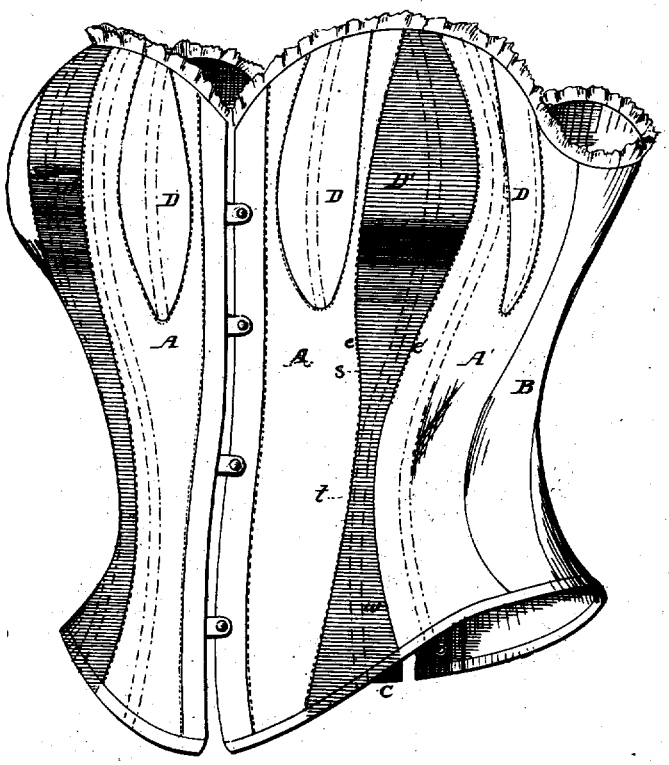

In the accompanying drawings, Figure 1 represents externally the improved corset—A A′ being breast-sections; B, hip-sections, and C the back pieces.

The usual steel hooks or clasps are secured at the edges of the breast-sections, and the back-sections are provided with the usual eyelets.

Figure 2:
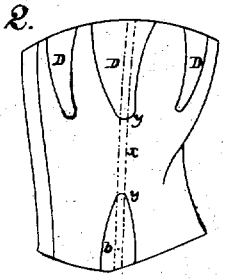

In ordinary corsets of the kind to which my improvement relates (that is, corsets having "bosom-pads" or "breast-receptacles" semi-spherical in external form, which extend above and cover the breasts,) each front section consists of one piece of cloth, and the breast-fullness or bosom-pad is formed at each side of the corset by means of elliptical "gores," or pieces D D D, (see diagram, Fig. 2) inserted in slits made at the top of the breast piece or front section, the hip and waist fullness being produced by a gore or gores, *b*, inserted in slits at the bottom.

This construction is objectionable, inasmuch as the pocket for the whalebone rib must be made across the seams at the ends of the gores, the pieces and gores must be basted before they can be sewed by a machine, and it is impossible to impart to the corset the necessary symmetry. For instance, the rib shown by dotted lines *x* in the diagram, Fig. 2, must cross the seams *y y* at the ends of the piece D and gore *b*, forming uncomfortable protuberances, and increasing the difficulty of manufacturing the articles, while that portion of the corset between the points *y y* is of uniform width, and cannot be shaped to fit the form of the wearer.

I overcome these objections by forming the upper piece and the lower gore of one continuous strip or piece, D′, which extends from the upper to the lower edge, and aids in imparting to the bosom-pad the proper semi-spherical form.

It will be seen that, the pieces being continuous, the rib-pocket *w* is also continuous and crosses no seams, avoiding the objectionable protuberances before alluded to. As each continuous piece forms one of the several sections composing the front, each extending from the top to the lower edge, the several parts may be connected by almost straight seams, *e e′*; the preliminary basting and nice fitting required in inserting the usual V-shaped or elliptical pieces being avoided, while the body of the corset may be fashioned of a better shape than where the breast section is of uniform width between the lines *s t*.

I claim—

1. A bosom-pad corset—that is, one having hollow projecting receptacles covering the breasts, the front of which is composed of three or more sections, one of the same being a continuous strip extending from the upper to the lower edge of the corset, and aiding in imparting the hollow semi-spherical form to the bosom-pad, substantially as set forth.

2. A bosom-pad corset, each front section of which consists of three or more sections united edge to edge, and extending the entire length of the corset, as set forth.

3. The combination, in a bosom-pad corset, of the continuous strip D′, extending through and forming part of the bosom-pad, and the inserted side pieces D D, arranged on opposite sides of said strip, as specified.

4. The combination, in a bosom-pad corset, of the breast-sections A A′ and a continuous strip, D′, inserted between and extending the length of the sections, aiding in forming the bosom-pad and the lower gore, and having a continuous pocket for a central rib, all substantially as and for the purpose specified.

In testimony whereof I have signed my name to this specification in the presence of two subscribing witnesses.

LUCIEN C. WARNER.

Witnesses:
N. H. GILLETTE,
ANNA BUCHANAN.